(12) United States Patent
Sheynblat et al.

(10) Patent No.: US 9,554,354 B2
(45) Date of Patent: Jan. 24, 2017

(54) SYSTEM AND/OR METHOD FOR PROVIDING INFORMATION UPDATES TO A LOCATION SERVER

(71) Applicant: QUALCOMM Incorporated, San Diego, CA (US)

(72) Inventors: Leonid Sheynblat, Hillsborough, CA (US); Ardalan Heshmati, Saratoga, CA (US); Arnold Jason Gum, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 12 days.

(21) Appl. No.: 14/591,667

(22) Filed: Jan. 7, 2015

(65) Prior Publication Data

US 2015/0119078 A1   Apr. 30, 2015

Related U.S. Application Data

(62) Division of application No. 11/832,630, filed on Aug. 1, 2007, now Pat. No. 8,971,797.

(60) Provisional application No. 60/834,917, filed on Aug. 1, 2006.

(51) Int. Cl.
| | |
|---|---|
| *H04W 24/00* | (2009.01) |
| *H04W 64/00* | (2009.01) |
| *G01S 5/00* | (2006.01) |
| *G01S 5/14* | (2006.01) |
| *G01S 11/06* | (2006.01) |
| *G01S 19/09* | (2010.01) |
| *G01S 19/42* | (2010.01) |

(52) U.S. Cl.
CPC ............ *H04W 64/00* (2013.01); *G01S 5/0036* (2013.01); *G01S 5/14* (2013.01); *G01S 11/06* (2013.01); *G01S 19/09* (2013.01); *G01S 19/42* (2013.01)

(58) Field of Classification Search
USPC .............. 455/404.1–404.2, 420–422.1, 432.1, 455/456.1–456.3, 457
See application file for complete search history.

(56) References Cited

U.S. PATENT DOCUMENTS

| | | | |
|---|---|---|---|
| 5,774,829 A | 6/1998 | Cisneros et al. | |
| 5,883,595 A | 3/1999 | Colley | |
| 5,999,124 A | 12/1999 | Sheynblat | |
| 6,085,091 A * | 7/2000 | Yoo ............ | H04W 36/32 370/332 |
| 6,313,786 B1 | 11/2001 | Sheynblat et al. | |

(Continued)

FOREIGN PATENT DOCUMENTS

| | | |
|---|---|---|
| CN | 1420702 A | 5/2003 |
| CN | 1592855 A | 3/2005 |

(Continued)

OTHER PUBLICATIONS

International Search Report and Written Opinion—PCT/US2007/074817, International Search Authority—European Patent Office—May 27, 2008.

*Primary Examiner* — Dai A Phuong
(74) *Attorney, Agent, or Firm* — Arnold J. Gum

(57) ABSTRACT

The subject matter disclosed herein relates to a system and method for acquiring signal received from satellite vehicles (SVs) in a satellite navigation system. In one example, although claimed subject matter is not so limited, information processed in acquiring a signal from a first SV may be used in acquiring a signal from a second SV.

12 Claims, 7 Drawing Sheets

(56) References Cited

U.S. PATENT DOCUMENTS

| | | | |
|---|---|---|---|
| 6,374,184 B1 * | 4/2002 | Zahm | B61L 25/023 701/408 |
| 6,774,797 B2 | 8/2004 | Freathy et al. | |
| 6,845,239 B1 * | 1/2005 | Sato | G01S 5/0027 342/457 |
| 7,299,063 B2 | 11/2007 | Kurihara | |
| 7,592,950 B2 | 9/2009 | Van Diggelen | |
| 8,725,169 B2 * | 5/2014 | Xiao | G01S 5/02 455/428 |
| 2002/0032525 A1 | 3/2002 | Yoshikawa et al. | |
| 2002/0084933 A1 | 7/2002 | Krasner | |
| 2003/0008670 A1 * | 1/2003 | Katoh | G01C 21/3415 455/456.1 |
| 2003/0096624 A1 | 5/2003 | Ormson | |
| 2003/0098811 A1 | 5/2003 | Nikolai et al. | |
| 2004/0198387 A1 * | 10/2004 | Tsuji | G01S 5/0036 455/456.1 |
| 2004/0257277 A1 | 12/2004 | Abraham et al. | |
| 2004/0266474 A1 * | 12/2004 | Petrus | H04B 17/382 455/525 |
| 2005/0021284 A1 | 1/2005 | Gaal | |
| 2005/0064879 A1 | 3/2005 | McAvoy | |
| 2005/0206559 A1 | 9/2005 | Diggelen et al. | |
| 2005/0227706 A1 | 10/2005 | Syrjarinne et al. | |
| 2006/0046664 A1 * | 3/2006 | Paradiso | G08B 25/009 455/96 |
| 2006/0089156 A1 | 4/2006 | Hayashi | |
| 2006/0128399 A1 | 6/2006 | Duan et al. | |
| 2006/0133271 A1 * | 6/2006 | Mizugaki | G01S 5/06 370/229 |
| 2006/0229805 A1 | 10/2006 | Diggelen et al. | |
| 2006/0232466 A1 | 10/2006 | Park et al. | |
| 2007/0237101 A1 * | 10/2007 | Cohen | H04L 67/327 370/310 |
| 2008/0032706 A1 | 2/2008 | Sheynblat et al. | |
| 2008/0039117 A1 | 2/2008 | Van Diggelen et al. | |
| 2009/0258648 A1 * | 10/2009 | Willey | H04W 48/10 455/435.1 |
| 2010/0156705 A1 | 6/2010 | Van Diggelen et al. | |
| 2011/0117922 A1 * | 5/2011 | Reitsma | H04W 64/00 455/456.1 |
| 2011/0117937 A1 * | 5/2011 | Meifu | G06Q 30/02 455/456.6 |
| 2016/0112841 A1 * | 4/2016 | Holland | G01S 5/0027 455/456.5 |

FOREIGN PATENT DOCUMENTS

| | | |
|---|---|---|
| EP | 1775598 | 11/2008 |
| GB | 2382270 A | 5/2003 |
| JP | H03176684 A | 7/1991 |
| JP | H10341475 A | 12/1998 |
| JP | H11513787 A | 11/1999 |
| JP | 2000131415 A | 5/2000 |
| JP | 2000304843 A | 11/2000 |
| JP | 2002090439 A | 3/2002 |
| JP | 2002196060 A | 7/2002 |
| JP | 2003204573 A | 7/2003 |
| JP | 2005195395 A | 7/2005 |
| JP | 2005538339 A | 12/2005 |
| JP | 2006125907 A | 5/2006 |
| JP | 2006517763 A | 7/2006 |
| JP | 2006322846 A | 11/2006 |
| JP | 2007518979 A | 7/2007 |
| JP | 2011523834 A | 8/2011 |
| WO | 9714049 A2 | 4/1997 |
| WO | 9954752 | 10/1999 |
| WO | WO-0045191 A2 | 8/2000 |
| WO | WO-03036322 A2 | 5/2003 |
| WO | 2004011957 A1 | 2/2004 |
| WO | WO-2004057360 A2 | 7/2004 |
| WO | WO-2004073343 A1 | 8/2004 |
| WO | WO-2005098466 A1 | 10/2005 |
| WO | 2009149104 A2 | 12/2009 |

* cited by examiner

SYSTEM AND/OR METHOD FOR PROVIDING INFORMATION UPDATES TO A LOCATION SERVER

This application is a divisional of U.S. patent application Ser. No. 11/832,630, filed Aug. 1, 2007, which claims the benefit of U.S. Patent Application No. 60/834,917, filed Aug. 1, 2006; each of these applications being assigned to the assignee hereof.

BACKGROUND

Field

The subject matter disclosed herein relates to obtaining information that may be used for determining a location of a receiver.

Information

Techniques such as trilateration are typically used to estimate a location of a device in a wireless cellular network (e.g., a cellular telephone network). Such trilateration is typically based, at least in part, upon the use of timing information transmitted between a mobile device and any one of several base stations. One approach, called Advanced Forward Link Trilateration (AFLT) in CDMA or Enhanced Observed Time Difference (EOTD) in GSM or Observed Time Difference of Arrival (OTDOA) in WCDMA, measures at the mobile device the relative times of arrival of signals transmitted from several base stations. These times are typically transmitted to a location server (e.g., a Position Determination Entity (PDE) in CDMA, a Serving Mobile Location Centre (SMLC) in GSM, etc.) over a wireless communication link. Here, such a location server typically computes estimates of a location of the mobile device using these times of reception. The transmit times at such base stations are typically synchronized to particular instances of times-of-day. Alternatively, the time relationship between free-running time references at these base stations can be known and used as a synchronization method. This way a base station clock need not be synchronized to common time reference. Known positions of the base stations and the times of reception are then typically used to estimate a location of the mobile device.

FIG. 1 shows an example of an AFLT system where times of reception (TR1, TR2, and TR3) of signals from cellular base stations 101, 103, and 105 are measured at mobile cellular telephone 111. This timing data may then be used to estimate a location of mobile cellular telephone 111. Such computation may be performed at mobile cellular telephone 111 itself, or at a location server if the timing information obtained by the mobile device is transmitted to the location server via a communication link. Typically, times of receptions are communicated to a location server 115 through one of the cellular base stations (e.g., base station 101, or 103, or 105) over a wireless communication link. Location server 115 is coupled to receive data from cellular base stations through the mobile switching center 113. Location server 115 may include a base station almanac (BSA) server, which provides the location of the base stations and/or the coverage area of base stations. Alternatively, the location server and the BSA server may be separate from one another while location server communicates with the base station to obtain the base station almanac for position determination. Mobile switching center 113 transmits information (e.g., voice communications) between base stations and a land-line Public Switched Telephone Network (PSTN) so that information may be transmitted between mobile cellular telephone 111 and other telephones (e.g., land-line phones on the PSTN or other mobile telephones). In some cases location server 115 may also communicate with mobile switching center 113 via a cellular link.

In another approach known as Uplink Time of Arrival (UTOA), times of reception of a signal from a mobile device are measured at several base stations (e.g., measurements taken at base stations 101, 103 and 105). This may be illustrated in FIG. 1 by reversing arrows associated with TR1, TR2, and TR3. This timing data may then be communicated to a location server to estimate a location of the mobile device.

Another technique in estimating a location of a mobile device involves measuring at the mobile device the times of arrival (aka "pseudoranges") of signals transmitted from several space vehicles (SVs) in a satellite positioning system (SPS) such as, for example, the United States Global Positioning Satellite (GPS), the Russian GLONASS system and/or the proposed European Galileo System. Alternatively, such pseudoranges may be detected from signals received from pseudolites. Here, a pseudolite typically includes a ground-based transmitter, which broadcasts a signal encoded with a PN code (similar to the encoding of a signal received from an SV of an SPS) modulated on an L-band carrier signal, generally synchronized with navigation signals from at least one SPS. A transmitter may be assigned a unique PN code so as to permit identification by a mobile device. Pseudolites are typically useful in situations where SPS signals from an orbiting satellite might be unavailable, such as tunnels, mines, buildings or other enclosed areas, for example. Methods which use an SPS receiver to estimate a location of a mobile station may be completely autonomous (in which the SPS receiver, without any assistance, determines the position of the mobile station) or may utilize the wireless network to provide assistance data or to share in the position calculation.

Regardless of a particular technique for estimating a location of a mobile device at a location server, such a mobile device typically transmits to the location server raw measurements obtained from signals received at the mobile device. Accordingly, transmission of such raw measurement data to such a location server typically uses significant link capacity between the mobile devices and the location server. The other artifact of sending the measurements to the location server is the need to establish a wireless connection between the mobile device and the base station and the time that it takes to establish such connection.

SUMMARY

In one particular example, a method and/or system is directed to combining a measurement of a distance between a mobile device with a previous measurement of the distance to obtain a measurement of the distance. The estimate is then transmitted from the mobile device to a location server. It should be understood, however, that this is merely one example of a particular implementation of claimed subject matter and that such claimed subject matter is not limited in this respect.

BRIEF DESCRIPTION OF THE FIGURES

Non-limiting and non-exhaustive examples will be described with reference to the following figures, wherein like reference numerals refer to like parts throughout the various figures

DETAILED DESCRIPTION

Figure 1:
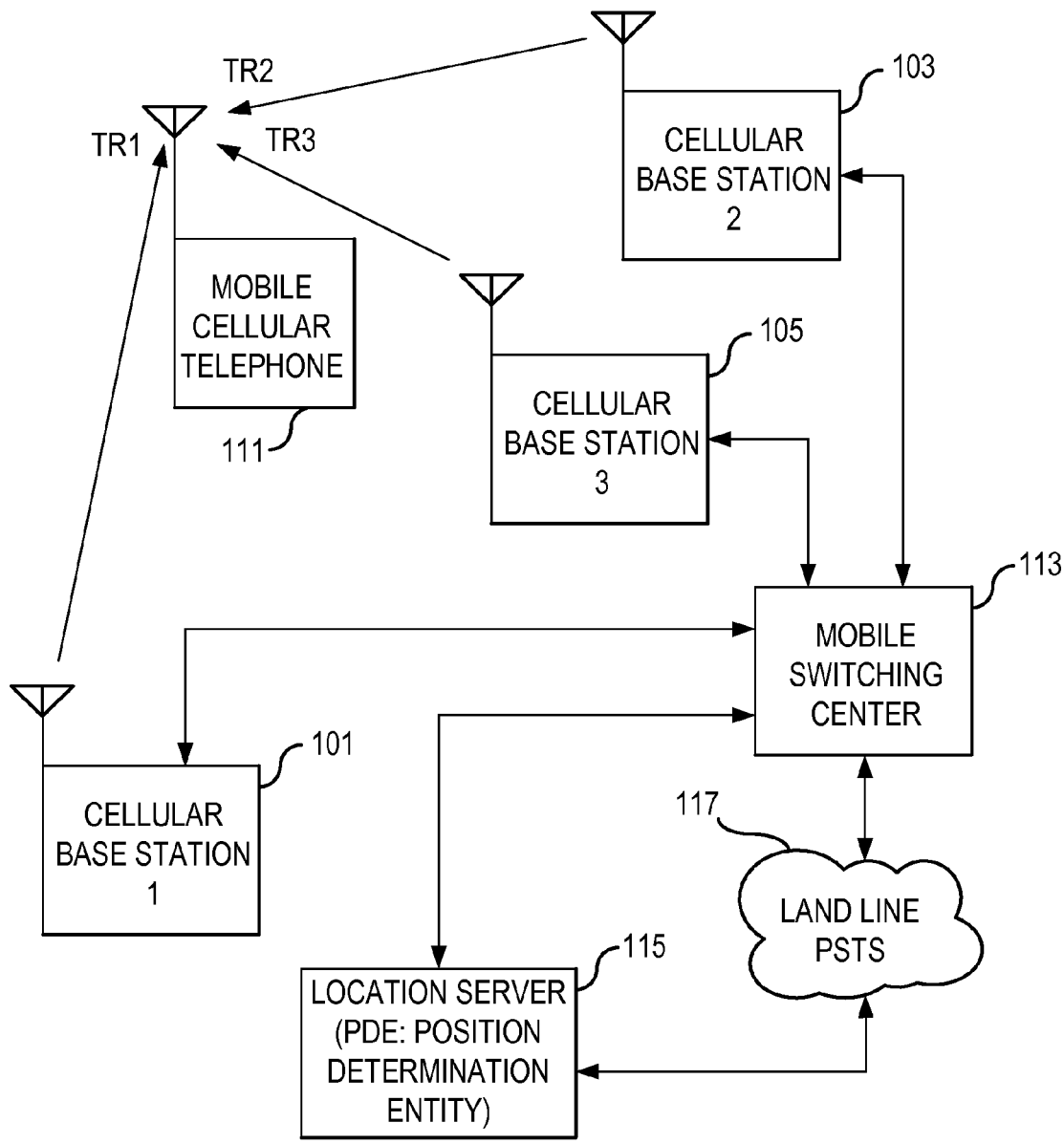
FIG. 1 is a schematic diagram of a wireless communication network in an example implementation.

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications in particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "extrapolating," "locating," "terminating," "identifying," "initiating," "detecting," "obtaining," "hosting," "updating," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

A "space vehicle" (SV) as referred to herein relate to an object that is capable of transmitting signals to receivers on the earth's surface. In one particular example, such an SV may comprise a geostationary satellite. Alternatively, an SV may comprise a satellite traveling in an orbit and moving relative to a stationary position on the earth. However, these are merely examples of SVs and claimed subject matter is not limited in these respects.

A "location" as referred to herein relates to information associated with a whereabouts of an object or thing according to a point of reference. Here, for example, such a location may be represented as geographic coordinates such as latitude, longitude and, optionally, altitude. In another example, such a location may be represented as earth-centered XYZ coordinates. In yet another example, such a location may be represented as a street address, municipality or other governmental jurisdiction, postal zip code and/or the like. However, these are merely examples of how a location may be represented in particular implementations and claimed subject matter is not limited in these respects.

Location determination techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

In one particular implementation, location of a mobile device may be estimated based, at least in part, on "pseudorange" measurements comprising approximations of distances between an associated transmitter and a receiver. Such a pseudorange measurement may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. In one implementation, a pseudorange may be represented in units of linear distance. Alternatively, such a pseudorange may be represented as propagation delay associated with transmission of a navigation signal from a transmitter and reception of the signal at a receiver. However, these are merely examples of how a pseudorange may be represented in particular implementations and claimed subject matter is not limited in these respects.

To determine its position, a satellite navigation receiver may obtain pseudorange measurements to three or more satellites as well as their positions at time of transmitting. Knowing the SVs' orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular implementations, it should be understood that these techniques may also apply to other types of SPS', and that claimed subject matter is not limited in this respect. Also, although particular examples are described herein with particular reference to SPS satellites, it will be appreciated that such descriptions may be applicable to positioning systems which utilize pseudolites or a combination of satellites and pseudolites. As discussed above, a pseudolite may comprise a ground-based transmitter which broadcasts a PN code (similar to a GPS signal) which may be modulated on an L-band carrier signal and synchronized with navigation signals or one or more particular SPS'. Such a transmitter may be assigned a unique PN code so as to permit identification by a remote receiver. The term "satellite", as used herein, is intended to include pseudolites, equivalents of pseudolites, and possibly others. The term "SPS signals", as used herein, is intended to include SPS-like signals from pseudolites and/or equivalents of pseudolites.

In one implementation, a location of a mobile device may be estimated based, at least in part, on signals received at the mobile device. Here, such a mobile device may comprise a receiver that is capable of obtaining raw measurements of a property, quantity and/or characteristic in connection with a received signal. In particular implementations, although claimed subject matter is not limited in these respects, such measured properties, quantities and/or characteristics may comprise, for example, timing information for use in trilateration and/or Uplink Time of Arrival (UTOA), pseudorange measurements, propagation delay, round trip delay, signal strength, just to name a few examples.

In one aspect, raw measurements of properties, quantities and/or characteristics may be represented as raw measurement data. Here, a mobile device may process the raw measurement data to provide estimates of values. The mobile device may then transmit the estimated values to a location server to be used in estimating a location of the mobile device, for example. Such an estimate of a value may comprise an estimate of an underlying property, quantity and/or characteristic that is being measured. However, such an estimated value may merely represent a value that may be derived from such an underlying property, quantity and/or characteristic that is being measured. In one implementation, for example, a mobile device may estimate a range to a transmitter based, at least in part, on raw measurements of a strength of a signal received from the transmitter and, optionally, knowledge of the power with which the signal was transmitted. The mobile device may then transmit the estimated range to a location server to be used in estimating a location of the mobile device. By processing raw measurement data to estimate values and transmitting resulting estimates to the location server, link capacity for transmitting information to the location server (to be used in estimating the location of the mobile device) may be reduced.

Figure 2:
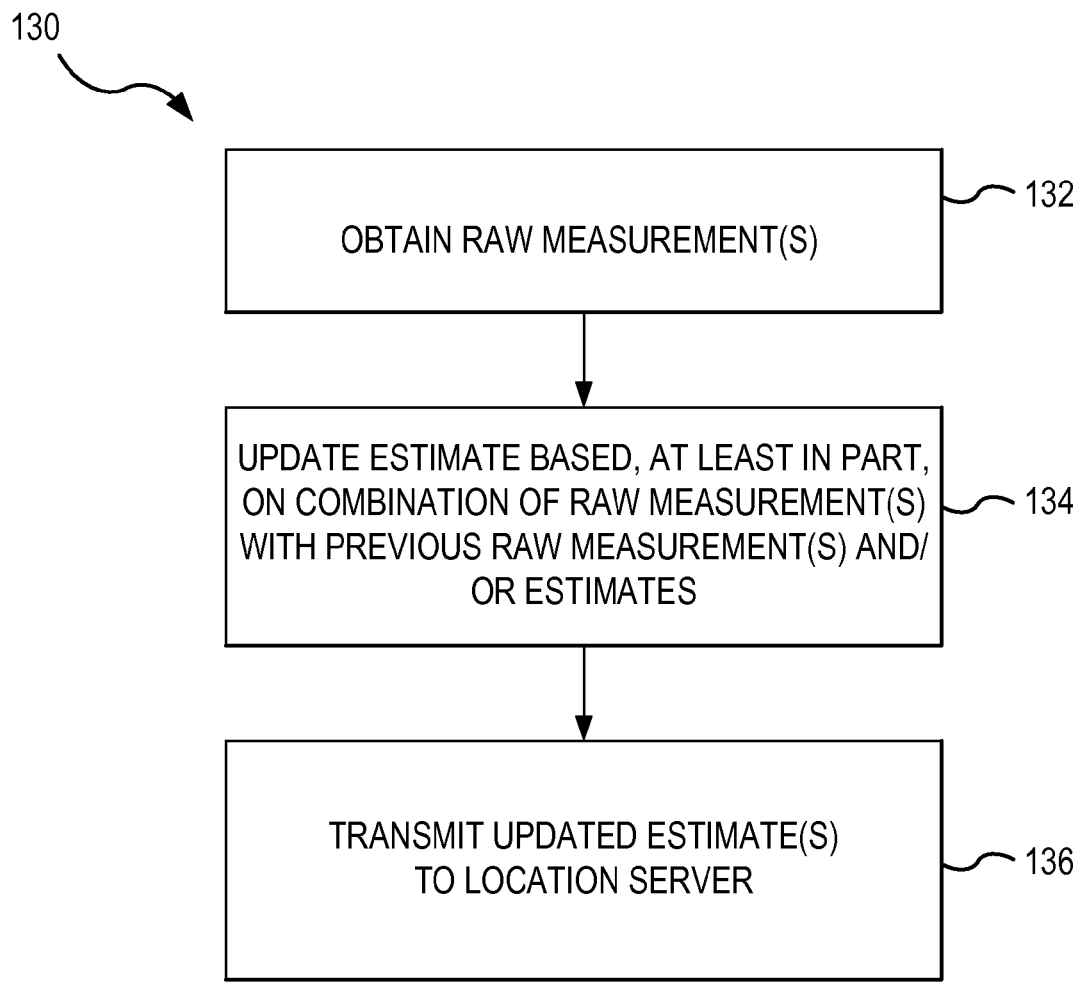
FIG. 2 is a flow diagram illustrating a process for providing an estimate from a mobile device to a location server according to an aspect of an implementation.

In one particular implementation, a mobile device comprising one or more receivers may execute process 130 illustrated in FIG. 2. Such a mobile device may comprise, for example, a mobile phone, personal digital assistant (PDA), notebook computer, personal navigation device (PND), personal mobile player (PMP) and/or the like. Based, at least in part, on signals received at one or more receivers, block 132 may obtain one or more raw measurements of properties, quantities and/or characteristics such as, for example, raw measurements of strength of received signals, signal time of arrival (e.g., absolute and/or relative times of arrival) from one or more remote transmitters, signal round trip delay for signals transmitted between the mobile device and one or more remote transmitters, and pseudorange, just to name a few examples.

In a particular aspect, properties, quantities and/or characteristics for which raw measurements are obtained at block 132 may vary over time. Accordingly, process 130 may obtain measurements of the same property, quantity and/or characteristic at different time instances. Here, such multiple measurements may be obtained on a predetermined cycle and/or in response to particular events and/or conditions, for example. However, these are merely examples of how the timing of taking raw measurements at particular instances in particular implementations and claimed subject matter is not limited in this respect. Also, measurements obtained at block 132 may be obtained in the presence of random noise. Accordingly, differences in measurements of the same property, quantity and/or characteristic obtained at different times may be attributed to either an actual change in the property, quantity and/or characteristic, measurement noise or both.

Rather than transmit raw measurement data to a location server, a mobile device may provide an estimate of a measured property, quantity and/or characteristic based, at least in part, on recently obtained raw measurements in combination with previously obtained raw measurements and/or estimates of values. Here, block 134 may combine a raw measurement of a property, quantity and/or characteristic obtained at block 132 with previously obtained raw measurements and/or estimates of values. In one implementation, block 134 may apply a filter to a series of raw measurements of a property, quantity and/or characteristic obtained at different times by, for example, computing a weighted sum of the measurements. Here, such a process may generate an estimate of a the measured property, quantity and/or characteristic comprising "filtered measurement data." In one particular example, block 134 may apply a Kalman filter to update a previous estimate of a value based, at least in part, on a raw measurement obtained at block 132. However, these are merely examples of how a raw measurement may be combined with previously obtained raw measurements and/or estimates of values in a particular implementation, and claimed subject matter is not limited in this respect.

In one implementation, block 134 may estimate a rate of change associated with a measured property, quantity and/or characteristic, and/or a rate of change of an estimate of a value. In a particular example where a raw measurement comprises a pseudorange to a transmitter (e.g., as part of an SPS), such an estimated rate of change may comprise a pseudorange rate, for example. In another example where a raw measurement comprises a relative time of arrival and/or signal propagation delay of a signal transmitted from a base station, such an estimate of a rate of change may comprise an expected rate of change in such a relative time of arrival and/or propagation delay. However, these are merely examples of how block 134 may estimate a rate of change associated with a measured property, quantity and/or characteristic.

In a particular implementation, block 134 may also determine the quality of the estimated of the value and the quality of the rate of change of the estimated value. These quality measure may be expressed in the same units as the estimated value and the rate of change of the estimated value. For the case of a pseudorange and a pseudorange rate these would be expressed in meters and meters per second. These are error estimates and can be sued by the location server to compute the location and the rate of change of the location of the mobile device.

In one example, although claimed subject matter is not limited in this respect, block 134 may extrapolate an updated estimate of a value to a particular instance of time. Such an extrapolated estimate may comprise a prediction of a value in the future that may be computed according to relation (1) as follows:

$$\hat{x}_p(t_1) = \hat{x}_e(t_0) + d\hat{x}(t_0)/dt^*(t_1-t_0) \qquad (1)$$

where:
$\hat{x}_e(t_0)$=estimate of a value x at time $t_0$;
$\hat{x}_p(t_1)$=prediction of value x at time $t_1$; and
$d\hat{x}(t_0)/dt$=estimated rate of change in value x at time $t_0$.

Alternatively, block 134 may extrapolate an estimate to an instance of time in the past that may be computed according to relation (2) as follows:

$$\hat{x}_p(t_{-1}) = \hat{x}_e(t_0) - d\hat{x}(t0)/dt^*(t_0-t_{-1}) \qquad (2)$$

where $\hat{x}_p(t_{-1})$ represents an extrapolation of an estimate of value x to a time in the past $t_{-1}$.

Finally, block 136 may transmit estimates determined at block 134 to a location server by, for example, transmitting one or more messages over a wireless communication link containing the estimates. The location server may then process the received estimates to, for example, estimate a location of the mobile device using one or more of the aforementioned techniques. Processing raw measurement data at a mobile device prior to transmission to a location server reduces a need to transmit raw measurement data over wireless links, permitting a service carrier to reduce wireless link loading while continuing to support location determination. This is particularly useful for tracking applications wherein a location of a mobile device is determined either on periodic or event-triggered basis.

Block 136 may transmit estimates determined at block 134 to a location server using any one of several techniques. In one particular example, such estimates may be transmitted in a terrestrial wireless communication link to a base station over a data channel. Here, for example, such estimates may be transmitted in payloads of data packets addressed to a location server according to an Mobile Internet Protocol, for example. Alternatively, these estimates may be sent over a dedicated circuit as in connection-oriented services or via packet-switched transmission as in connectionless services. It should be noted that any digital or analog wireless communication channel can be used to transmit the measurements between the mobile device and the corresponding base station. However, these are merely examples of how estimates of values may be transmitted over a terrestrial wireless communication link in particular implementations, and claimed subject matter is not limited in this respect.

Using estimates received from a mobile device as illustrated above, a location server may then compute an estimate of a location of the mobile device. In addition to using estimates received from the mobile device to compute such an estimate of a location, a location server may also use other information available at a network such as, for example, known locations of transmitters (e.g., SPS satellites, cellular base stations and WLAN access points), various parameters associated with the base stations such as tilt angle, frequency, sector configuration, forward link time delay just to name a few, angle-of-arrival measurements, transmission power associated with transmitters, cell identification information, signal round-trip delay (RTD), round-trip time (RTT), signal strength (RSSI) and signal strength database for signal strength pattern matching, time advance, and/or the like. However, these are merely examples of different types of information that a location server may use, in addition to estimates of values received from a mobile device, for computing a location estimate and claimed subject matter is not limited in this respect.

Figure 3:
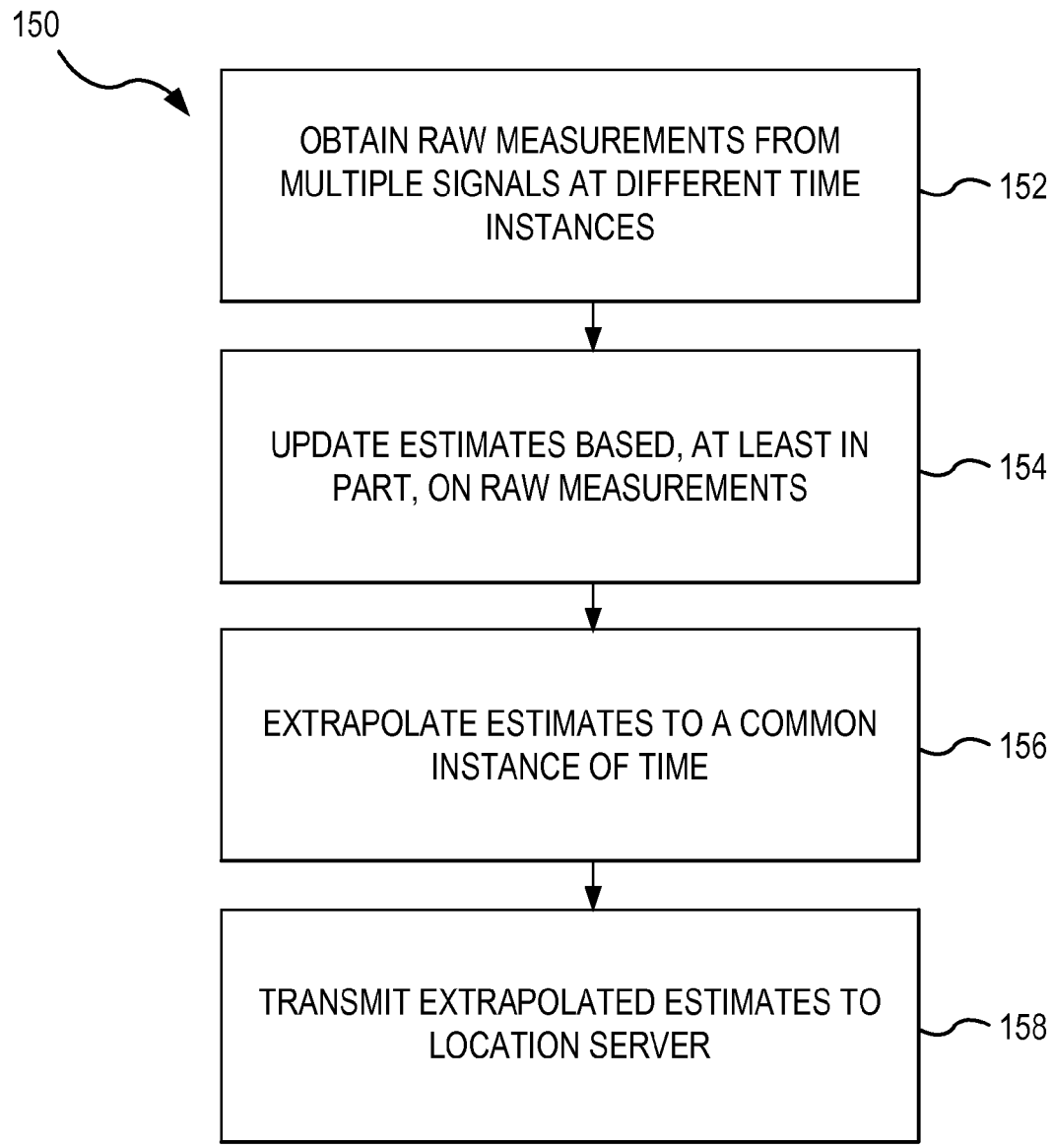
FIG. 3 is a flow diagram illustrating a process for providing estimates from a mobile device to a location server according to an alternative example implementation which are referenced to a common instance of time according to an alternative example implementation.

In one implementation, a mobile device may obtain raw measurements of multiple properties, quantities and/or characteristics. In one particular example, a mobile device may obtain pseudorange measurements to multiple SVs in an SPS. Also, the mobile device may obtain such raw measurements of different properties, quantities and/or characteristics at different instances of time. As illustrated in process 150 shown in FIG. 3, estimates of such different properties, quantities and/or characteristics may be referenced to a common instance of time prior to transmission to a location server.

At block 152, a mobile device may obtain measurements of multiple properties, quantities and/or characteristics at different associated times. Continuing with the particular example of obtaining pseudorange measurements to multiple SVs in an SPS, the mobile device may obtain a first such pseudorange measurement at block 152 and update an associated estimate of the pseudorange as illustrated above with reference to FIG. 2 at a first instance of time. The mobile device may then obtain a second such pseudorange measurement at a second instance of time later than the first instance of time. In one implementation, prior to transmission of updated estimates of pseudorange determined at block 154, block 156 may extrapolate one or more of the updated estimates such that estimates of multiple pseudoranges are referenced to a common instance of time. In a particular example, block 152 may obtain raw pseudorange measurements to transmitters 1 through n at associated times $t_1$ through $t_n$ as $R_1(t_1)$ through $R_n(t_n)$ while block 154 updates estimates of pseudoranges as $\hat{R}_1(t_1)$ through $\hat{R}_n(t_n)$. Here, block 156 may extrapolate estimates $\hat{R}_1(t_1)$ through $\hat{R}_n(t_n)$ to a common instance of time $t_i$ where $t_1 < t_i < t_n$ as follows:

$$\hat{R}_1(t_i) = \hat{R}_1(t_1) + d\hat{R}_1(t_1)/dt * (t_i - t_1)$$

$$\ldots$$

$$\hat{R}_n(t_i) = \hat{R}_n(t_n) + d\hat{R}_n(t_n)/dt * (t_i - t_n)$$

where:
$\hat{R}_j(t_i)$=an extrapolation of an estimate of a pseudorange to a transmitter j at instance of time $t_i$; and
$d\hat{R}_k(t_k)/dt$=estimated rate of change in pseudorange to transmitter k at time $t_k$.

Upon an extrapolation of estimates of values to a common time instance at block 156, block 158 may package and transmit such extrapolated instances to a location server for additional processing, as discussed above, to determine, for example, an estimate of a location of the mobile device. By extrapolating such values at the mobile device, data link requirements may be further relieved. In another example, the extrapolated $\hat{R}_1(t_1)$ through $\hat{R}_n(t_n)$ can be averaged such that only the average estimated pseudorange is transmitted to the server, further reducing data link requirements.

Alternatively, a mobile device may first filter estimated pseudoranges $\hat{R}_1(t_1)$ through $\hat{R}_n(t_n)$ and then forward the filtered pseudorange to a location server. As one example, a complementary filter may be used as follows:

$$\hat{R}_1(t_n) = 1/n * \hat{R}_1(t_n) + (n-1)/n * \hat{R}_1(t_{n-1})$$

where:
$R_1(t_{n-1})$=estimated pseudorange from the previous epoch. Weights used to filter the pseudoranges can be based on filter count (representing filter's time constant or memory) and/or error estimates associated with a current pseudorange estimate $\hat{R}_1(t_n)$ and previous estimate $\hat{R}_1(t_{n-1})$. It should be noted that other well known filtering techniques can be used, Kalman filter being one of those.

In some implementations of a location estimation system, SPS signals from one or more satellites for obtaining a pseudorange measurement may move in and out of view, or otherwise be undetectable due, for example, on environmental effects such as multi-path and blockage. It should be observed, however, that using the above described techniques pseudorange measurements obtained from a particular satellite may be extrapolated to points in time when an SPS signal from the particular satellite is undetectable. In a particular implementation, such pseudorange measurements may be weighted based, for example, on whether the pseudorange measurement is obtained from a presently detectable SPS signal or pseudorange measurement extrapolated from an SPS signal that was acquired in the past. Here, for example, pseudorange measurements obtained from such a presently detectable SPS signal may be more heavily weighted (e.g., by association of a smaller variance) than pseudorange measurements which are extrapolated from the past. In one particular example, although claimed subject matter is not limited in this respect, pseudorange measurements may be extrapolated with the use of assistance data including, for example, ephemeris and/or almanac data and time.

As pointed out above, a pseudorange may be estimated in process 150 using a Kalman filter. Other implementations, block 134 may estimate a pseudorange by merely combining pseudoranges to an SV measured at different time instances. In one example, multiple pseudorange measurements to an SV obtained at different times may be merely averaged to estimate a pseudorange to the SV. Alternatively, such a combination of pseudorange measurements may comprise a weighted average of pseudorange measurements obtained at different instances. In one particular implementation, such pseudorange measurements may be weighted according to when the pseudorange measurement is obtained (e.g., most recently obtained pseudorange measurements being weighted most heavily while older measurements are given less weight). In another particular implementation, such pseudorange measurements may be weighted according to signal strength when the pseudorange measurement is obtained (e.g., pseudorange measurements obtained from signals with highest signal strength being weighted most heavily while measurements obtained from signals with a lower signal strength are given less weight). Alternatively, such pseudorange measurements may be weighted according to perceived presence of multipath when the pseudorange measurement is obtained (e.g., pseudorange measurements obtained from signals in perceived low multipath environment being weighted most heavily while measurements obtained from signals in perceived high multipath environment are given less weight).

Also, the discussion above illustrates an application of process 150 to a particular implementation in which raw measurements obtained at block 152 comprise pseudorange measurements to transmitters. It should be understood, however that process 152 may also apply to extrapolation to a common time instance of estimates of other values such as, for example, strength of received signals, signal time of arrival (e.g., absolute and/or relative times of arrival) from one or more remote transmitters, signal round trip delay for signals transmitted between the mobile device and one or more remote transmitters. Additionally, process 150 may also be applied to a hybrid approach to estimating a location of a mobile device from combinations of estimates of values derived from raw measurements of different types of properties, quantities and/or characteristics. In a particular example, for the purpose of illustration, such raw measurements from different types of properties, quantities and/or characteristics may comprise pseudorange measurements to at least one transmitter and strength of signals received from at least one other transmitter. Here, for example, estimates of pseudorange and strength of signals may be extrapolated to a common instance of time at block 156 before transmission to a location server at block 158.

Figure 4:
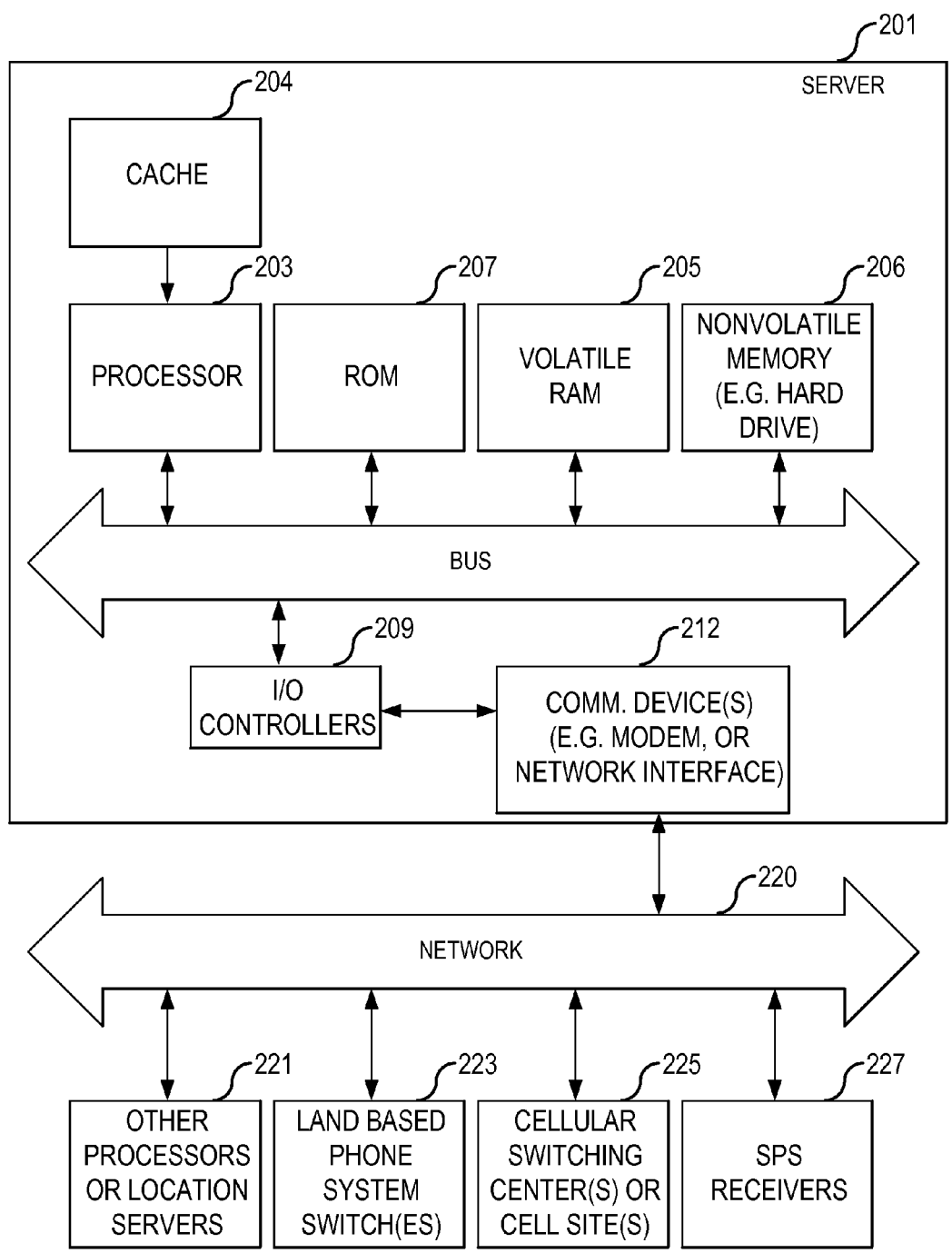
FIG. 4 is a schematic diagram of a system including a location server in an example implementation.

FIG. 4 is a schematic diagram of a computing platform adapted to communicate with a mobile device over a wireless communication link in a particular implementation. In one aspect, server 201 may provide assistance data such as Doppler, almanac, ephemeris, satellite time and/or other satellite assistance data to an SPS receiver in a mobile device. In addition, or alternatively, server 201 may comprise a location server adapted to estimate a location of such a mobile device based, at least in part, on information received from the mobile device such as, for example, estimates of values determined according to processes 130 or 150 discussed above, for example. Such an estimate of location of the mobile device may then be forwarded to a base station, application server, location services gateway or other system, for example. Server 201 comprises communication devices 212, such as modems or network interface, coupling server 201 to a number of other networks. Such other networks may include, for example, one or more intranets, a cellular switching center or multiple cellular switching centers 225, land based phone system switches 223, packet-switch network with packet data switching nodes (PDSN), IP network, cellular base stations (not shown), SPS receivers 227, and/or other processors or location servers 221.

In one particular implementation, multiple cellular base stations may be arranged to cover a geographical area with an associated radio coverage while being coupled to at least one mobile switching center (e.g., FIG. 1 and related discussion above). Thus, multiple base stations may be geographically distributed but coupled together by such a mobile switching center. Network 220 may be connected to a network of reference SPS receivers providing SPS ephemeris data for use in estimating locations of mobile devices using techniques known to those of ordinary skill in the art. Network 220 may also be connected to other computer systems operated by emergency operators, such as the Public Safety Answering Points which respond to "911" telephone calls.

Server 201 comprises a bus 202 which is coupled to a microprocessor 203 and a ROM 207 and volatile RAM 205 and a non-volatile memory 206 by bus 202. The bus 202 may include one or more buses connected to each other through various bridges, controllers and/or adapters as is well known in the art. It should be understood that, in particular implementations, location server 201 may perform its operations automatically without human assistance. Alternatively, however, operation of location server 201 may be controlled by, and/or in response to, human inputs received at an I/O controller 209 from keyboards, and other I/O devices.

It should be understood that FIG. 4 illustrates various components of a computing platform as an example according to a particular implementation, and that claimed subject matter is not limited in this respect. It will also be appreciated that network computers and other computing platforms which have fewer components or perhaps more components may also serve as a location server and/or a position determination entity (PDE). In addition to functions identified above, in some implantations, computing platforms performing functions of a location server may perform other functions such as, for example, cellular switching, messaging services, etc. In these cases, some or all components shown in FIG. 4 may be shared among multiple functions.

As pointed out above, processes, techniques, methods and/or the like described herein may be executed, at least in part, by a computing platform adapted to execute machine-readable instructions stored in a storage medium. In a particular implementation, such machine readable instructions may be stored in a memory such as ROM 207, volatile RAM 205, non-volatile memory 206, cache 204 or a remote storage device, and may be adapted for execution by processor 203. Alternatively, portions of processes, techniques and/or methods may be carried out, at least in part, by hardwired circuitry in combination with the execution of machine-readable instructions.

Figure 5:
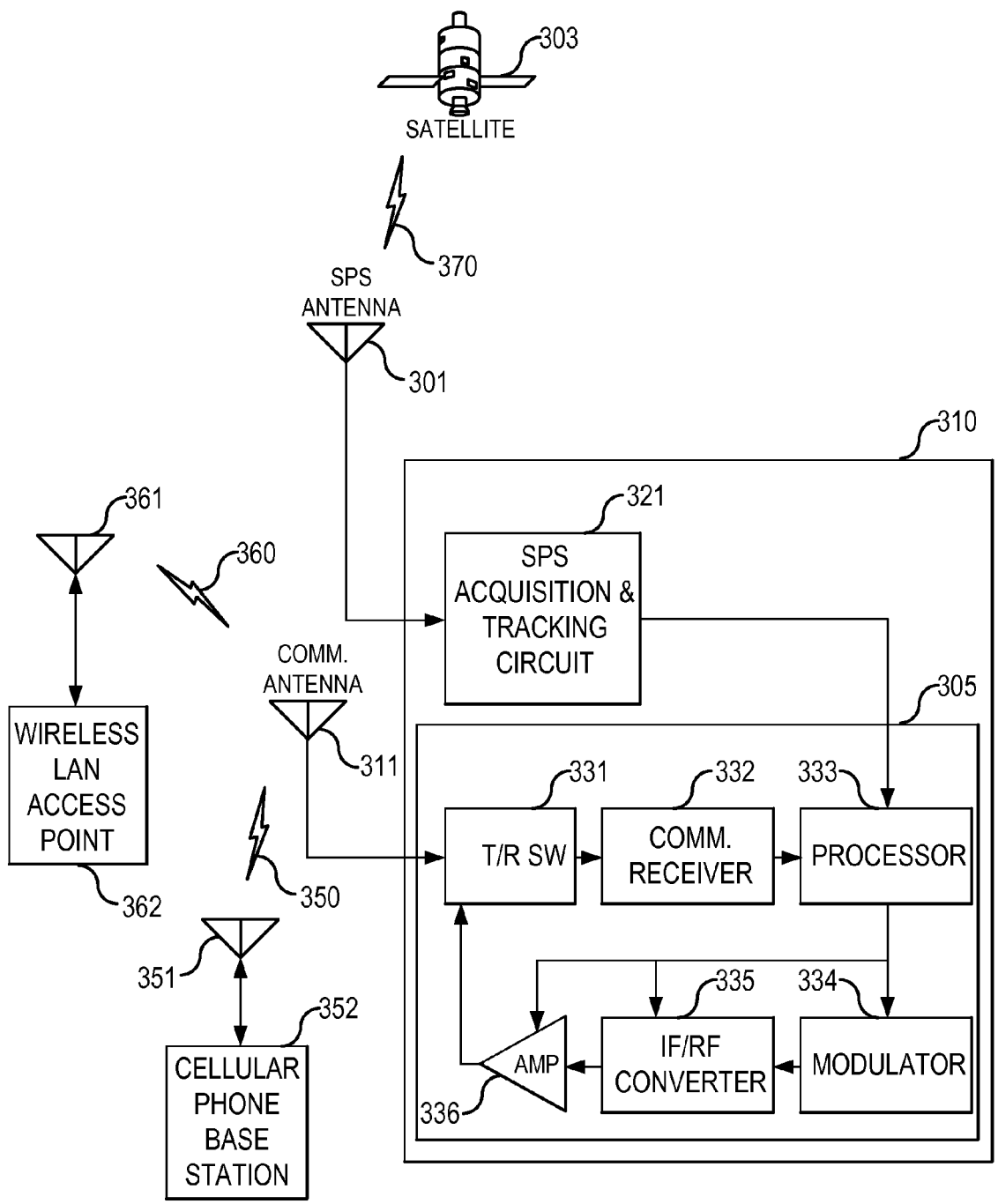
FIG. 5 is a schematic diagram of a mobile device according to an example implementation.

FIG. 5 is a schematic diagram of a mobile device 310 in one particular implementation. Mobile device 310 includes a receiver 305, which is adapted to process signals received from SPS satellites (e.g., for determining pseudorange measurements) and communicate with other devices over terrestrial wireless communication links 350 and 360. Here, terrestrial wireless communication links 350 and 360 may comprise radio frequency communication links to transmit information between mobile device 310 and either cellular base station 352 (having communication antenna 351) or WLAN access point 362 (having communication antenna 361). Although FIG. 5 illustrates an implementation employing a single communication antenna 311 for receiving signals from different types of wireless access points (e.g., from access point 362 for wireless LAN and from based station 352 for cellular phone service), receiver 305 may employ separate and distinct antennas (not shown) for receiving signals of different air interfaces in other implementations. Further, in alternative implementations mobile device 310 may employ separate and distinct components for at least a partial processing of wireless signals received at different air interfaces, and may or may not share some components in the processing of such wireless signals received at different air interfaces. For example, mobile device 310 may comprise a combined receiver with separate circuits for processing RF signals received at different air interfaces, while sharing data processing resources for baseband processing. From this description, various combinations and variations of the combined receiver will be apparent to one skilled in the art, and claimed subject matter is not limited in this respect.

Mobile device 310 is merely an example of a combined SPS receiver, and a communication receiver and transmitter in a particular implementation, and claimed subject matter is not limited in this respect. Alternatively, mobile device 310 may employ multiple receivers and transmitters for different wireless networks and/or different air interfaces. For example, mobile device 310 may comprise a transceiver portion for receiving and/or transmitting cellular telephone signals and another transceiver portion for receiving and/or transmitting Wi-Fi signals.

Mobile device 310 comprises an SPS receiver stage including acquisition and tracking circuit 321 coupled between receiver 305 and SPS antenna 301. Here, SPS signals (e.g., signal 370 transmitted from satellite 303) may be received at acquisition and tracking circuit 321 through SPS antenna 301. Acquisition and tracking circuit 321 may then acquire Pseudorandom Noise (PN) codes for the various received satellites. The data produced by circuit 321 (e.g., correlation indicators) may be processed by processor 333 for determination of SPS pseudoranges.

Transceiver 305 comprises a transmit/receive switch 331 which is adapted to route communication signals (e.g., RF signals) between communication antenna 311 and transceiver 305. Alternatively, a band splitting filter, or "duplexer," may be employed for routing communication signals between communication antenna 311 and transceiver 305. Information in signals received at communication antenna 311, and processed at communication receiver 332, may be processed at processor 333. Similarly, processor 333 may initiate transmission of information over terrestrial wireless communication links 350 and 360 through modulator 334 and frequency converter 335. Power amplifier 336 may set a signal to an appropriate level for transmission to base station 352 (or to wireless LAN access point 362).

In one implementation, communication transceiver section 305 may be capable of being used with a number of different air interfaces (e.g., IEEE 802.11, bluetooth, UWB, TD-SCDMA, IDEN, HDR, TDMA, GSM, CDMA, W-CDMA, UMTS, or other similar networks) for communication (e.g., through communication links 350 and 360). Here, for example, communication transceiver section 305 may be capable of being used with one air interface for communicating information and capable of processing signals according to other air interfaces to, for example, process navigation signals transmitted by an SPS, extract timing indicators (e.g., timing frames or system time) and/or calibrate local oscillators (not shown).

In one implementation, mobile device 310 may obtain measurements of one or more properties, quantities and/or characteristics based, at least in part, on information received at antennas 301 and/or 311. Again, such properties, quantities and/or characteristics may comprise, for example, pseudorange, strength of received signals, signal time of arrival (e.g., absolute and/or relative times of arrival) from one or more remote transmitters, signal propagation delay, signal round trip delay for signals transmitted between the mobile device and one or more remote transmitters. Alternatively, these signals may be transmitted to and/or received from other mobile devices. As illustrated above, mobile device 310 may then transmit estimates of values based, at least in part, on raw measurements of properties, quantities and/or characteristics to a location server (not shown) through terrestrial wireless communication link 350 and/or 360. Such a location server may then estimate a location of mobile device 310 based, at least in part, on such estimates and other information (e.g., satellite orbital data (such as ephemeris data) received from an SPS receiver and/or other sources of such data). Again, such an estimate of the location mobile device 310 may then be transmitted back to mobile device 310 or to other remote locations, for example.

In particular implementations as pointed out above, mobile device 310 may comprise, or be coupled to, any one of several portable devices such as, for example, a cellular telephone, personal digital assistant, portable personal computer, and/or the like. However, these are merely examples of mobile devices capable of communicating over wireless communication links and claimed subject matter is not limited in these respects. the combined SPS receiver includes (or is coupled to) a data processing system (e.g., a personal data assistant, or a portable computer). As such, mobile device 310 may comprise a computing platform comprising a microprocessor and a memory (e.g., ROM, volatile RAM, non-volatile memory) which is adapted to execute machine-readable instructions to perform one or more of techniques, methods and/or processes described herein, in whole or in part. Such a computing platform may include, and/or be coupled to, a display controller, display device and/or other peripheral devices such as which are well known in the art.

In one implementation, mobile device 310 may store locations and identifications (e.g., MAC address) of wireless access points (e.g., according to the types of the wireless access points) for extracting and enhancing location information associated with the wireless access points according to machine-readable instructions stored in memory. In one implementation, mobile device 310 may store locations of mobile stations and identifications of WLAN access points upon establishing a communication connection.

As pointed out above, in particular implementations a location server may estimate a location of a mobile device based, at least in part, on measurements of a mixture of different types of properties, quantities and/or characteristics obtained in a hybrid positioning system at a mobile device. For example, such a location server in a hybrid location positioning system may estimate a location of a mobile device from estimates of values derived from raw measurements of two or more types of properties, quantities and/or characteristics. Such types of properties, quantities and/or characteristics may comprise, for example, pseudorange measurements, signal strength, signal time of arrival from one or more remote transmitters, signal round trip delay for signals transmitted between the mobile device and one or more remote transmitters. In a particular example, for the purpose of illustration, such a location server may estimate a location of a mobile device based, at least in part, on estimates of values derived from raw measurements of two pseudoranges to satellites in an SPS and strength of signals received from two different WLAN access points. Here, as illustrated above, such a mobile device may provide filtered estimates of either the pseudoranges and/or signal strengths (which are based, at least in part, on raw measurements of these properties, quantities and/or characteristics) to a location server over a wireless communication link.

In particular implementations, a hybrid positioning system may comprise different independently operated elements (e.g., SPS transmitters, WLAN access points, cellular base stations) that operate asynchronously from one another where, for example, raw measurements are obtained from different systems and referenced to different corresponding instances in time. In combining such raw measurements to obtain an estimate (e.g., an estimate of a pseudorange), such raw measurements referenced to different instances of time may be associated with one another based, at least in part, on information correlating time references of different systems on which the raw measurements are based.

Additionally, in particular embodiments of a hybrid positioning system raw measurements obtained from different systems may be associated with different accuracies, uncertainties and/or precisions. In combining such raw measurements to obtain an estimate, raw measurements may be weighted according to an associated accuracy, uncertainty and/or precision associated with the raw measurements. Here, for example, an estimate may be obtained based, at least in part, on a weighted sum of raw measurements. In a particular example, raw measurements associated with a high accuracy and/or low uncertainty may be weighted more heavily in such a weighted sum than raw measurements associated with a low accuracy and/or high uncertainty.

Figure 6:
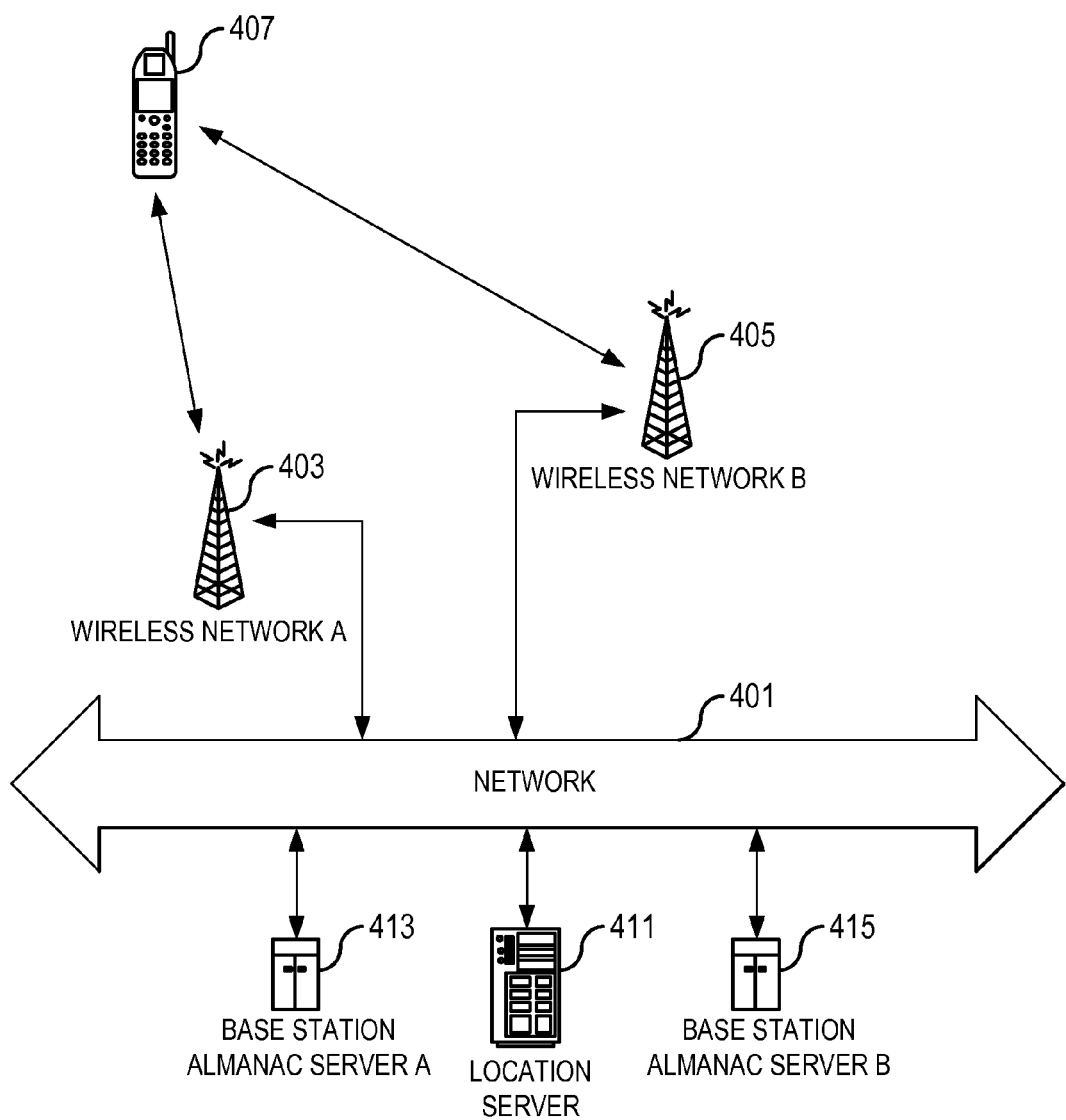
FIG. 6 is a schematic diagram of a topology of network employing a hybrid approach for estimating a location of a mobile device according to an aspect of an implementation.

FIG. 6 is a schematic diagram of a network topology of a hybrid positioning system in a particular implementation. A mobile device 407 may receive signals transmitted from both a wireless access point 403 of wireless network A and wireless access point 405 of wireless network B. In one implementation, mobile device 407 may also include a receiver for receiving SPS signals from one or more SPS satellites (not shown). Mobile device 407 may also be adapted to take timing measurements (e.g., pseudorange, round trip time, times of arrival of signals, time differences of arrival of signals) based, at least in part, on signals received from wireless network A and/or B. It should be understood that wireless network A and/or B may individually include multiple access points (e.g., cellular base stations such as wireless access points 403 and 405). Wireless networks A and B may also employ the same type of air interface, operated by different service providers, or they may operate with the same communication protocols but at different frequencies, for example. Alternatively, wireless networks A and B may employ different types of air interfaces (e.g., TDMA, GSM, CDMA, W-CDMA, UMTS, TD-SCDMA, IDEN, HDR, bluetooth, UWB, IEEE 802.11, or other similar networks), operated by the same service provider or by different service providers.

In one implementation, although claimed subject matter is not limited in this respect, location server 411 may estimate a location of mobile device 407 based, at least in part, on information received from mobile device 407 such as, for example, estimates of values. As pointed out above, such estimates of values may be based, at least in part, on raw measurements of properties, quantities and/or characteristics taken at mobile device 407. As illustrated above, such estimates may comprise estimates of pseudorange measurements, signal propagation delay, round-trip delay between mobile device 407 and a base station, signal strengths, and/or the like. Servers 413 and 415 may maintain almanac data associated with wireless networks A and B respectively. Such almanac data may comprise, for example, a database identifying locations of such access points (e.g., as a latitude and longitude and/or earth-centered XYZ coordinates) specified by identification information (e.g. MAC address or cell tower identifier, etc.). Accordingly, location server 411 may estimate a location of mobile device 407 based, at least in part, on information communicated from the mobile station and data in the almanac servers 413 and 415.

Location server 411 may estimate a location of mobile device 407 using any one of several techniques by, for example, identifying known locations (e.g., SPS satellite, wireless access points 403 and 405) retrieved from servers 413 and 415, and obtaining estimates of ranges between mobile device 407 and the known locations from information received from mobile device 407 (e.g., estimates of one or more properties, quantities and/or characteristics) using techniques known to those of ordinary skill in the art. For example, U.S. Pat. No. 5,999,124 provides a discussion of how SPS pseudorange measurements and other range measurements may be combined to estimate a location of a mobile station.

In one implementation, mobile device 407 may access either wireless networks A or B for communicating with location server 411 (e.g., instead of using only one of the wireless networks for communication purpose). As known in the art, various types of information can be exchanged between mobile device 407 and location server 411 for estimating location of mobile device 407. To enable mobile device 407 to acquire navigation signals from an SPS. For example, location server 411 can provide mobile device 407 with Doppler frequency search windows and other acquisition assistance information associated with satellites "in view" of mobile device 407 (e.g., through wireless network A or B).

Figure 7:
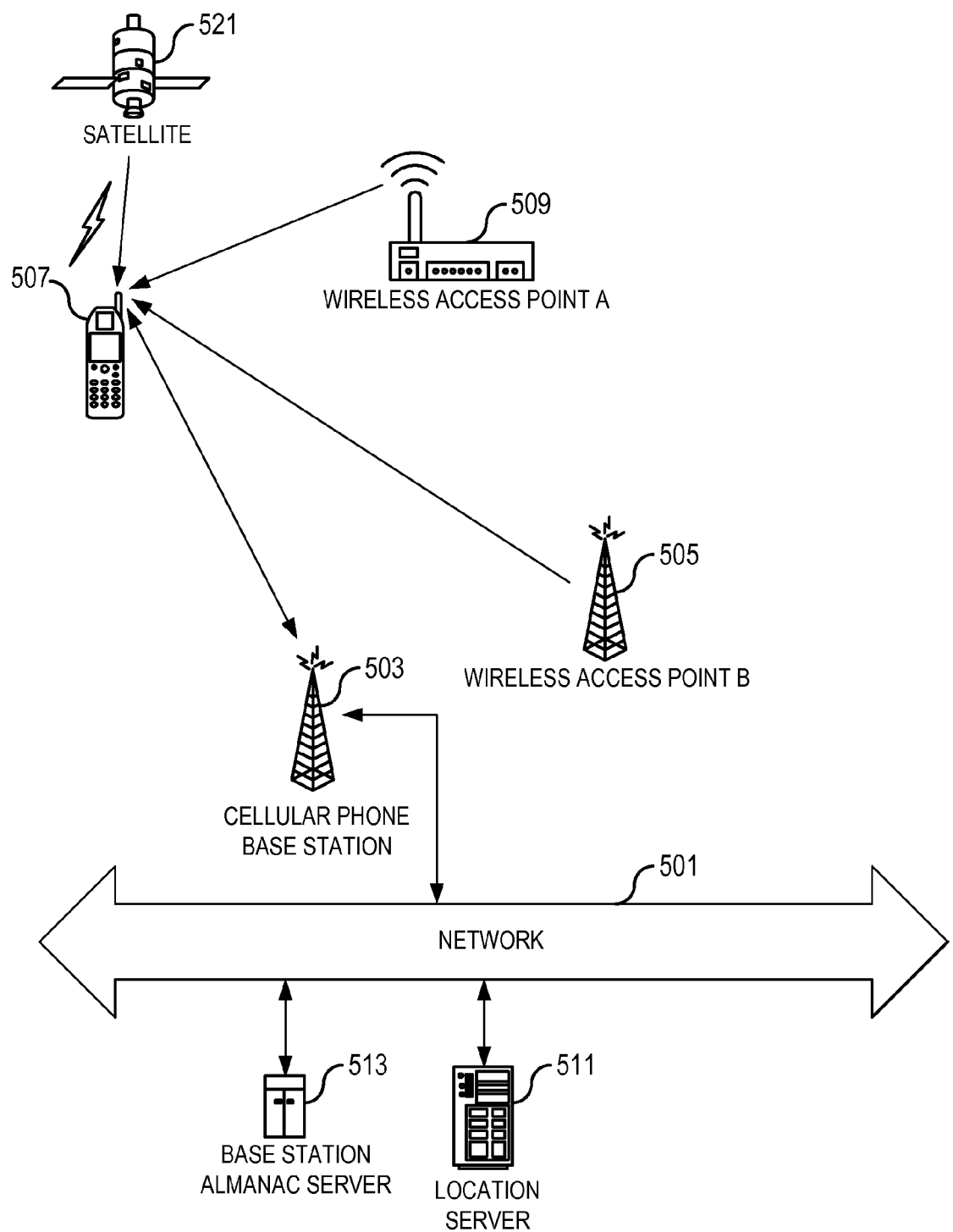
FIG. 7 is a schematic diagram of a topology of network employing a hybrid approach for estimating a location of a mobile device according to an alternative example.

FIG. 7 is a schematic diagram of a network topology of a hybrid positioning system in an alternative implementation. An access point of one wireless network (e.g., cellular base station 503) may be used for communication between mobile device 507 and location server 511. Here, location server 511 may estimate a location of mobile device 507 based, at least in part, on signals received at mobile device 507 such as, for example, SPS navigation signals (e.g., from satellite 521), signals from access points providing a first communication service (e.g. cellular phone base station 503), signals from access points providing a second communication service (e.g., access point B 505, which can be a base station of a different wireless cellular phone network and/or using a different air interface), and/or access point points providing a third communication service (e.g., access point A 509, which may comprise a WLAN or Bluetooth access point, for example). Here, as pointed out above, mobile device 507 may obtain raw measurements and estimate values based, at least in part, on such raw measurements.

Here, a WLAN access point (or other similar low power transmitter) may provide a coverage area small enough that having any estimate of location of a mobile device bounded within the coverage area provides an adequate estimate of the location of the mobile device. Further, wireless LAN access points may provide signals for determining location in areas where the availability of other types of signals (e.g., SPS signals or wireless telephone signals) may be low.

In one implementation, a location server may estimate a location of a mobile device based, at least in part, on wireless signals received at the mobile device from different wireless networks. For example, signals from different wireless networks may be used to determine identities of access points. When precision range information (e.g., round trip time and/or signal propagation delay between an access point and a mobile device) is available to a location, a location server may use such range information and location of an access point to estimate a location of a mobile device based, at least in part, on a hybrid solution. Using techniques illustrated above, a location server may receive from a mobile device a estimates of one or more values such as, for example, range, round trip time and/or signal propagation delay between an access point and the mobile device where such estimates are based, at least in part, on raw measurements taken at the mobile device.

While there has been illustrated and described what are presently considered to be example implementations, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular implementations disclosed, but that such claimed subject matter may also include all implementations falling within the scope of the appended claims, and equivalents thereof.

What is claimed is:

1. A method comprising, at a mobile device:
   measuring distances between a mobile device and a plurality of transmitters based, at least in part, on signals received from said plurality of transmitters at said mobile device;
   estimating distances between said mobile device and said plurality of transmitters at a common instance of time, at least in part, by combining a measurement of a distance between said mobile device and at least one of said plurality of transmitters with at least one previous measurement of said distance to provide an estimate of said distance; and
   transmitting said estimated distances from said mobile device to a location server.

2. The method of claim 1, wherein said estimating said distances further comprises:
   extrapolating said estimate to said common instance of time.

3. The method of claim 1, wherein said combining further comprises estimating said distance substantially according to a Kalman filter.

4. A mobile device comprising:
   a transceiver; and
   a processor coupled to said transceiver and configured to:
      measure distances between a mobile device and a plurality of transmitters based, at least in part, on signals received from said plurality of transmitters via said transceiver;
      estimate distances between said mobile device and said plurality of transmitters at a common instance of time, at least in part, by combining a measurement of a distance between said mobile device and at least one of said plurality of transmitters with at least one previous measurement of said distance to provide an estimate of said distance; and initiate transmission of said estimated distances via said transceiver to a location server.

5. The mobile device of claim 4, said processor being further configured to:
extrapolate said estimate to said common instance of time.

6. The mobile device of claim 4, said processor being further configured to estimate said distance substantially according to a Kalman filter.

7. A mobile device comprising:
means for measuring distances between a mobile device and a plurality of transmitters based, at least in part, on signals received from said plurality of transmitters at said mobile device;
means for estimating distances between said mobile device and said plurality of transmitters at a common instance of time, at least in part, by combining a measurement of a distance between said mobile device and at least one of said plurality of transmitters with at least one previous measurement of said distance to provide an estimate of said distance; and
means for transmitting said estimated distances from said mobile device to a location server.

8. The mobile device of claim 7, and further comprising:
means for extrapolating said estimate to said common instance of time.

9. The mobile device of claim 7, and further comprising:
means for estimating said distance substantially according to a Kalman filter.

10. An article comprising:
a non-transitory computer-readable medium, said non-transitory computer-readable medium comprising machine-readable instructions stored thereon that are executable by one or more processors of a mobile device to:
measure distances between a mobile device and a plurality of transmitters based, at least in part, on signals received from said plurality of transmitters at said mobile device;
estimate distances between said mobile device and said plurality of transmitters at a common instance of time, at least in part, by combining a measurement of a distance between said mobile device and at least one of said plurality of transmitters with at least one previous measurement of said distance to provide an estimate of said distance; and
initiate transmission of said estimated distances from said mobile device to a location server.

11. The article of claim 10, said machine-readable instructions being further executable by said one or more processors of said mobile device to:
extrapolate said estimate to said common instance of time.

12. The article of claim 10, said machine-readable instructions being further executable by said one or more processors of said mobile device to:
estimate said distance substantially according to a Kalman filter.

* * * * *